United States Patent
Asam et al.

(10) Patent No.: US 8,938,956 B2
(45) Date of Patent: Jan. 27, 2015

(54) METHOD OF OPERATING AN ENERGY RECOVERY CYLINDER

(75) Inventors: Dirk Asam, Ulm (DE); Jochen Fehse, Kellmünz (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 275 days.

(21) Appl. No.: 13/298,429

(22) Filed: Nov. 17, 2011

(65) Prior Publication Data

US 2012/0291430 A1 Nov. 22, 2012

(30) Foreign Application Priority Data

Nov. 17, 2010 (DE) .......................... 10 2010 051 650

(51) Int. Cl.
| | |
|---|---|
| F16D 31/00 | (2006.01) |
| F16D 31/02 | (2006.01) |
| F15B 11/00 | (2006.01) |
| F15B 13/00 | (2006.01) |
| E02F 9/22 | (2006.01) |
| F15B 11/064 | (2006.01) |
| F16F 9/52 | (2006.01) |

(52) U.S. Cl.
CPC ............ *E02F 9/2217* (2013.01); *E02F 9/2296* (2013.01); *F15B 11/064* (2013.01); *F16F 9/52* (2013.01)
USPC .................. 60/329; 60/372; 60/414; 60/418; 91/511

(58) Field of Classification Search
USPC ............. 60/508, 325–494; 92/51, 52; 91/4 R, 91/4 A, 169, 511
See application file for complete search history.

(56) References Cited

U.S. PATENT DOCUMENTS

| | | | | | |
|---|---|---|---|---|---|
| 3,912,096 | A | * | 10/1975 | Carpenter ...................... | 414/694 |
| 5,944,159 | A | * | 8/1999 | Schneider et al. .......... | 192/85.63 |
| 6,918,247 | B1 | * | 7/2005 | Warner ........................... | 60/414 |
| 6,983,592 | B2 | * | 1/2006 | Bruun ............................. | 60/415 |
| 7,434,391 | B2 | * | 10/2008 | Asam et al. ..................... | 60/414 |
| 8,418,451 | B2 | * | 4/2013 | Stanger et al. .................. | 60/372 |
| 2002/0037681 | A1 | * | 3/2002 | Gitis et al. ....................... | 451/5 |
| 2007/0278030 | A1 | | 12/2007 | Knapp | |
| 2010/0018195 | A1 | * | 1/2010 | Stanger et al. .................. | 60/414 |
| 2010/0024412 | A1 | * | 2/2010 | Hyodo et al. ................... | 60/426 |
| 2010/0050621 | A1 | * | 3/2010 | Beschorner et al. ........... | 60/329 |
| 2010/0218492 | A1 | * | 9/2010 | Galloway et al. ............... | 60/327 |
| 2010/0269496 | A1 | * | 10/2010 | Mueller et al. ................. | 60/325 |

FOREIGN PATENT DOCUMENTS

| | | |
|---|---|---|
| DE | 202006009223 | 9/2007 |
| DE | 102008034582 | 1/2010 |
| DE | 102008040054 | 1/2010 |
| WO | 02/095243 | 11/2002 |

* cited by examiner

*Primary Examiner* — Christopher Jetton
(74) *Attorney, Agent, or Firm* — Dilworth & Barrese, LLP.

(57) ABSTRACT

The present invention relates to an implement, in particular an excavator or machine for material handling, with an element movable via at least one working drive, wherein at least one energy recovery cylinder is provided for energy recovery from the movement of the movable element, which includes a chamber filled with gas, wherein the actuation of the implement is effected in dependence on the directly or indirectly determined temperature of the gas in the chamber filled with gas.

17 Claims, 6 Drawing Sheets

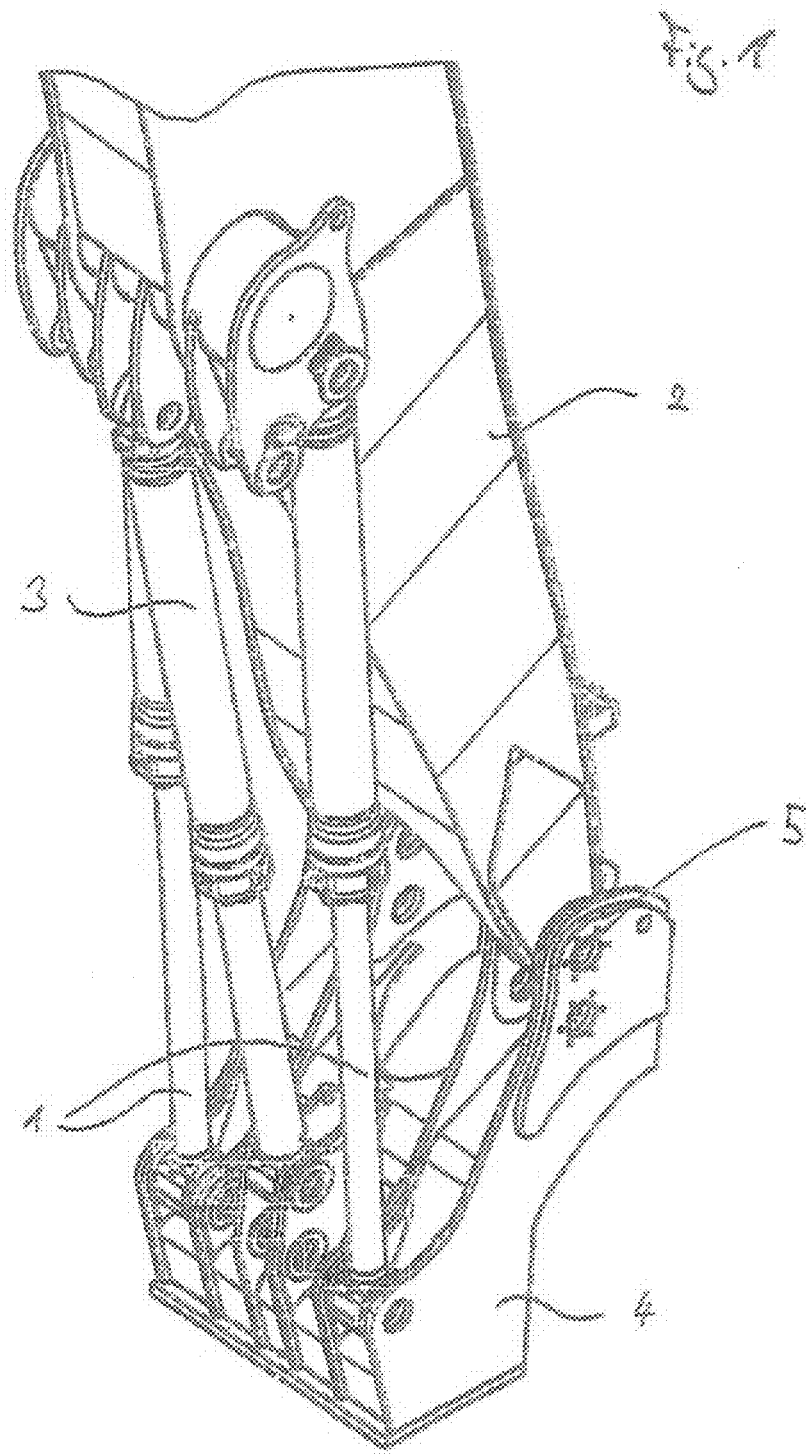

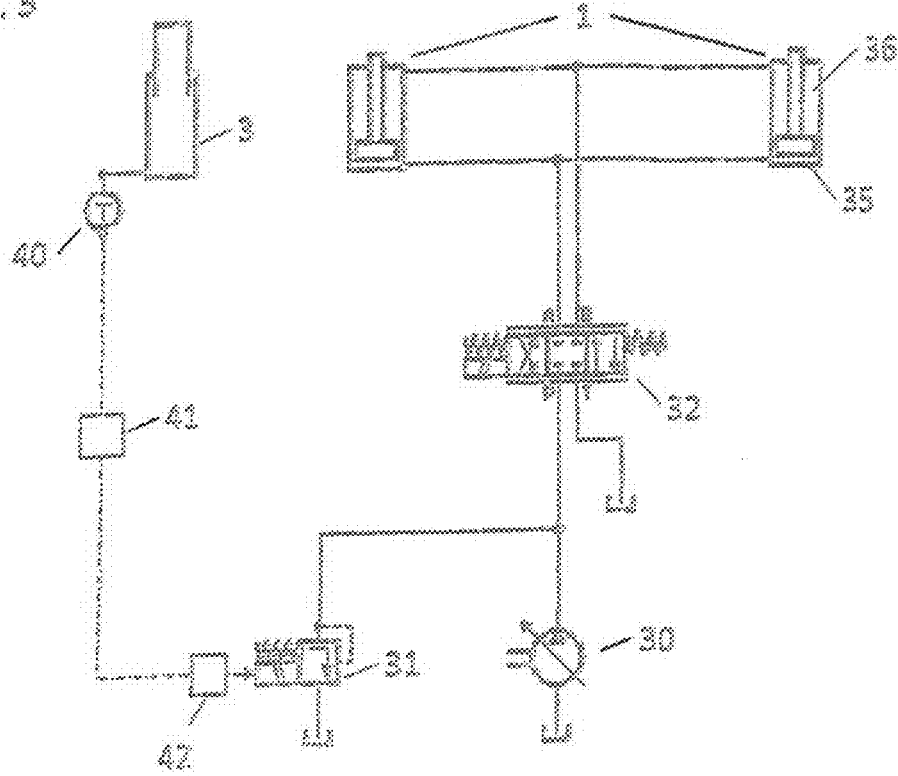

METHOD OF OPERATING AN ENERGY RECOVERY CYLINDER

BACKGROUND OF THE INVENTION

The present invention relates to an implement with an element movable via at least one working drive, wherein at least one energy recovery cylinder is provided for energy recovery from the movement of the movable element, which includes a chamber filled with gas. In particular, the implement is an excavator or a machine for material handling. The present invention in particular is used in such implements in which the working drive comprises at least one working hydraulic cylinder by which the movable element can be moved.

In such implements, the gas-filled chamber of the energy recovery cylinder is compressed when lowering the movable element and thus stores the potential energy, in order to release the same again during an upward movement of the movable element for supporting the working drive.

From DE 10 2008 034 582 A1 an implement is known, in which the gas-filled chamber of the energy recovery cylinder is formed by the gas-filled bottom side of the energy recovery cylinder and the hollow piston rod of the energy recovery cylinder.

SUMMARY OF THE INVENTION

It is the object of the present invention to further improve the function of such implement with an energy recovery cylinder with a chamber filled with gas.

In accordance with the invention, this object is solved by an implement according to the description herein. The present invention relates to an implement with an element movable via at least one working drive, wherein at least one energy recovery cylinder is provided for energy recovery from the movement of the movable element, which includes a chamber filled with gas. In accordance with the invention it is provided that the actuation of the implement is effected in dependence on the temperature of the gas in the chamber filled with gas. In particular, a system for the direct or indirect determination of the temperature of the gas in the chamber filled with gas therefore is provided, which supplies a signal which serves as input variable of the controller.

The inventors of the present invention now have found that the temperature of the gas in the gas-filled chamber of the energy recovery cylinder has a considerable influence on the force/path characteristic curve of the energy recovery cylinder. In accordance with the invention, a system for the direct or indirect determination of the temperature of the gas therefore is provided, wherein the actuation of the implement takes account of the influence of the temperature of the gas on the characteristic curve of the energy recovery cylinder. In particular, the actuation of the implement at least partly compensates the change in the characteristic curve of the energy recovery cylinder in case of a change in the temperature of the gas in the chamber filled with gas.

In a preferred embodiment of the present invention, the actuation of the working drive of the movable element is effected in dependence on the temperature of the gas in the chamber filled with gas. In particular, the actuation of the working drive thus compensates the change in the characteristic curve of the energy recovery cylinder in case of a change in the temperature of the gas in the chamber filled with gas.

The temperature of the gas in the chamber filled with gas can be determined both directly and indirectly. Advantageously, a temperature sensor is provided, which measures the temperature of the gas in the chamber filled with gas. In principle, it should be considered here that the gas temperature is less suitable as control variable, since it fluctuates very much depending on the state of movement. Alternatively or in addition, it is also possible to measure the temperature of an element of the energy recovery cylinder or the implement, which is connected with the chamber in a heat-conducting manner. The temperature of the gas can also be determined by other indirect methods. The gas temperature for example can also be determined by measuring the cylinder stroke/gas pressure profile or by the cylinder speed/gas pressure profile.

Advantageously, the temperature signal is averaged over a certain time period and used as input variable of the controller. Advantageously, an actuating variable of the drive is varied in dependence on the temperature of the gas, in particular on the averaged temperature of the gas. In particular, a map for the control variable in dependence on the temperature of the gas can be stored in the controller.

In a first embodiment of the invention it is provided that the maximum force of the working drive is adjusted in dependence on the temperature signal.

In particular, the maximum force of the working drive is increased with a decreasing temperature of the gas. This eliminates the problem that at low temperatures of the gas the energy recovery cylinder provides a lower pressure or a lower cylinder force than at higher temperatures, so that at gas temperatures below a certain setpoint, the desired lifting capacities possibly cannot be achieved. To nevertheless be able to achieve the required lifting capacities despite a low gas temperature, the maximum force of the working drive therefore is increased correspondingly, so as to on the whole achieve the desired lifting capacity.

Furthermore, the total lifting capacity achievable will also increase with increasing gas temperature and hence increasing gas pressure in the energy recovery cylinder. In this way, the loads of the equipment can be increased beyond an admissible value, which can reduce the useful life of the equipment. In accordance with the invention, it can therefore also be provided that the maximum force of the working drive is reduced in case of a rising temperature of the gas in the gas cylinder. In this way, the higher load of the equipment is counteracted by the energy recovery cylinder.

In particular, the maximum force of the working drive can be reduced, when the temperature of the gas lies above a setpoint gas temperature. Furthermore, the maximum force of the working drive can be increased, when the temperature lies below a setpoint gas temperature. In particular, the actuation is effected in dependence on the characteristic curve of the energy recovery cylinder.

Advantageously, the maximum force of the working drive is adjusted such that the maximum lifting capacity of the movable element always is kept substantially the same. In particular, the force of the working drive is adjusted such that the sum of the force of the working drive and the force of the energy recovery cylinder corresponds to a desired setpoint independent of the temperature of the gas.

In a further embodiment of the present invention the work dynamics of the working drive can be adjusted in dependence on the temperature signal. Here, the influence of the temperature also can change the work characteristic of the entire system of energy recovery cylinder and working drive. In particular, the change of the characteristic curve of the energy recovery cylinder with changing temperature of the gas is compensated by a corresponding actuation of the working drive.

The work dynamics of the machine (lifting and lowering the movable element) usually is matched with the characteristic of the energy recovery cylinder at a setpoint temperature. However, if the gas temperature lies below the desired setpoint temperature, the gas pressure is lower than the setpoint gas pressure. On the other hand, the gas pressure is greater than the setpoint, when the gas temperature lies above the desired setpoint temperature. This leads to the fact that a reduction of the gas temperature below the setpoint would lead to an increased lowering speed and a reduced hoisting speed, whereas a gas temperature above the setpoint temperature would lead to a reduced lowering speed and an increased hoisting speed. Advantageously, the working drive now is actuated in dependence on the temperature signal such that these changes of the work dynamics are counteracted.

In this way, too great hoisting and lowering speeds can be avoided, which would increase the component loads. Furthermore, the operation of the implement is simplified, as substantially always the same work dynamics is provided for the operator. In addition, all activities are possible at any time. In particular, a sufficiently fast movement of the movable element thus is always available.

In particular, in dependence on the gas temperature, in particular the current mean gas temperature, the actuation of the lifting and lowering function of the movable element is adapted such that the maximum lifting and lowering speed can always be kept the same.

The present invention in particular is used in such implements in which the working drive comprises at least one working hydraulic cylinder. In accordance with the invention, the actuation of the hydraulics of the working hydraulic cylinder is performed in dependence on the direct or indirect temperature signal. In particular, a signal of a system which directly or indirectly measures the temperature of the gas in the energy recovery cylinder thus is provided to the controller of the hydraulics of the implement.

In a first embodiment it can be provided that the primary pressure of the hydraulics of the working drive is adjusted in dependence on the temperature signal. To at least partly compensate the influence of the gas temperature on the lifting capacities of the implement, the primary pressure limitation of the working hydraulic cylinders temporarily is increased or reduced in accordance with the invention in the required or admissible range in dependence on the gas temperature. In particular, the primary pressure limitation is increased, in order to achieve the desired lifting capacities despite a low gas temperature. If the gas temperature then rises as a result of the working activity or as a result of a supply of external heat, the primary pressure limitation of the working cylinder can again be reduced to the usual setpoint. On the other hand, the primary pressure limitation of the boom cylinders can be reduced temporarily in dependence on the gas temperature, in order to counteract a too high load of the equipment. In particular, the pressure limitation of the boom cylinders can be reduced temporarily, when the temperature of the gas rises above a certain value.

In particular, a maximum primary pressure of the hydraulics of the working drive hence is adjusted. Advantageously, this is effected by actuating a primary pressure limiting valve. The same usually limits the pressure of the hydraulic fluid provided by a pump to a maximum operating pressure.

In a second exemplary embodiment it is provided that the work dynamics of the working hydraulic cylinder is adjusted in dependence on the temperature signal. In dependence on the gas temperature, in particular the current mean gas temperature, the actuation of the lifting and lowering function of the movable element thereby can be adapted such that the influence of the gas temperature on the maximum lowering or hoisting speed is at least partly compensated.

For example, in dependence on the gas temperature the pilot pressure or the actuation current of the corresponding valves for lifting and/or lowering the movable element can be adapted correspondingly. In particular, the pilot pressure and/or the actuation current can be increased or reduced, in order to adapt the valve opening cross-section and hence the maximum speed on lowering and/or lifting.

On lowering, in particular the pipe-rupture valves can be actuated correspondingly. On lifting, on the other hand, the valves of the control block advantageously are actuated in dependence on the temperature.

Furthermore, the swivel angle of the respective hydraulic pump and/or the speed of the diesel engine can be adapted in dependence on the temperature of the gas in the energy recovery cylinder. This is also advantageously effected on lifting the movable element.

By adapting the primary pressure limitation of the working hydraulics according to the invention in dependence on the gas temperature in the energy recovery cylinder, the desired lifting capacities can be secured and the equipment load can be limited.

On the other hand, by adapting the pilot pressures or electric pilot signals in dependence on the gas temperature in the energy storage cylinder, both the work dynamics of the machine and the component load can be kept constant.

As a result, the energy recovery cylinder can act as an autarkical system, whereas the temperature-dependent adaptation is effected by modifying the existing hydraulic system.

In accordance with the invention, the adjustment advantageously can be made with reference to a current mean gas temperature. Within a certain time interval, the mean gas temperature each can be determined and serve as a control variable for the adjustment.

Beside the implement according to the invention, the present invention furthermore comprises a method for operating an implement with an element movable via at least one working drive, wherein at least one energy recovery cylinder is provided for energy recovery from the movement of the movable element, which includes a chamber filled with gas. In accordance with the invention it is provided that the actuation of the working drive is effected in dependence on the temperature of the gas in the chamber filled with gas. In this way, the same advantages can be achieved which have been described already with regard to the implement. Advantageously, the method is effected such as has already been described above.

Furthermore, the present invention comprises an energy recovery cylinder for an implement as it has been described above. In particular, the energy recovery cylinder comprises a temperature sensor. In particular, the temperature sensor can measure the temperature of the gas in the chamber filled with gas and/or the temperature of an element of the energy recovery cylinder connected with this chamber in a heat-conducting manner. Further measurement methods are usable, as already explained above.

Furthermore, the present invention advantageously comprises a controller for a working drive for an implement as it has been described above in detail. In particular, a temperature signal serves as input variable of the controller. In particular, the controller actuates the working hydraulics of a working drive in dependence on the temperature signal.

Advantageously, energy recovery cylinders or the controller are designed such as has already been set forth above with regard to the implement.

Particularly preferred uses of the present invention will now briefly be described once more:

The implement according to the invention in particular is a traveling implement, in particular an excavator or a machine for material handling.

The same includes an element movable via at least one working drive, in particular a working hydraulic cylinder, wherein at least one energy recovery cylinder is provided for energy recovery from the movement of the movable element.

The energy recovery cylinder with the gas-filled chamber itself serves as energy accumulator for energy recovery from the movement of the movable element. The space formed by the bottom side of the energy recovery cylinder advantageously is filled with pressurized gas which is compressed during a movement of the piston rod against the bottom. The energy stored then is available again during an upward movement of the piston rod for supporting the working drive, in particular the working hydraulic cylinder. In a furthermore advantageous way, the piston rod of the energy recovery cylinder is hollow and open towards the bottom side, so that the interior of the piston rod forms a part of the chamber filled with gas.

The movable element of the implement according to the invention advantageously is pivotally attached to the implement about a vertical axis of rotation and pivotable in a vertical swivel plane via the one or more working drives, in particular working hydraulic cylinders. In particular, the movable element is the arm of an excavator or the boom of a machine for material handling. Furthermore advantageously, the traveling implement includes an undercarriage with traveling gear and an uppercarriage rotatably arranged thereon about a vertical axis of rotation, to which the movable element is articulated.

On the movable element a working tool, for example a shovel or a grab, can be arranged. When lowering the movable element, the potential energy of the movable element and of the working tool is stored via the energy recovery cylinder, in order to at least partly compensate the equipment weight again during the upward movement of the movable element. As a result, less energy must be spent via the working hydraulic cylinders, in order to move the movable element upwards. As a result, the energy balance of the implement is improved, since less installed engine power is required and the fuel consumption is lowered.

Like the one or more working hydraulic cylinders, the energy recovery cylinder according to the invention advantageously is arranged between an uppercarriage of the implement and the movable element. During a movement of the movable element, the energy recovery cylinder thus moves simultaneously with the working hydraulic cylinder.

BRIEF DESCRIPTION OF THE DRAWINGS

The present invention will now be explained in detail with reference to exemplary embodiments and drawings.

In the drawings:

FIG. 1 shows an exemplary embodiment of an implement according to the invention with two working hydraulic cylinders and one energy recovery cylinder, FIG. 3 shows a first exemplary embodiment of the controller for the working drive according to the invention, wherein the maximum force of the working drive is adjusted in dependence on the temperature of the gas in the energy recovery cylinder, FIG. 6b shows a diagram which represents a pilot pressure of a control valve for actuating the movement of a working drive in dependence on the temperature profile shown in FIG. 6a.

DESCRIPTION OF THE PREFERRED EMBODIMENTS

Figure 2A:
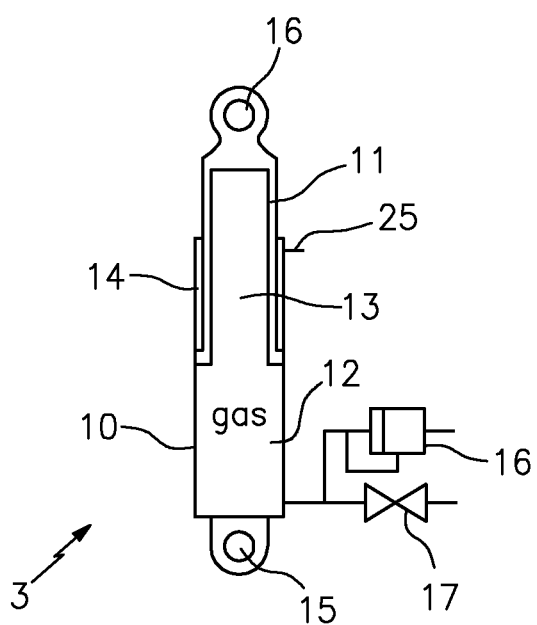
FIG. 2a shows a schematic diagram of a first variant of the energy recovery cylinder according to the invention.

With reference to FIGS. 1 and 2 an exemplary embodiment of an implement with an energy recovery cylinder will now first be shown in general, in which the present invention can be used.

The implement comprises a movable element 2 which is articulated to a welded construction 4 of the implement via a horizontally extending swivel axis 5. The implement is a hydraulic excavator in which the movable element 2 is mounted around the excavator boom, which is articulated to the uppercarriage of the excavator. The uppercarriage itself is pivotally attached to an undercarriage with chassis about a vertical axis of rotation.

For moving the movable element 2, two working hydraulic cylinders 1 are provided, which via corresponding articulation points are articulated to the movable element 2 and to the welded construction 4 of the uppercarriage. Furthermore, an exemplary embodiment of an energy recovery cylinder 3 according to the invention is provided, which like the working hydraulic cylinders 1 is arranged between the movable element 2 and the uppercarriage of the implement 4 and serves for energy recovery from the movement of the movable element. The energy recovery cylinder 3 is arranged between the two working hydraulic cylinders 1.

On the movable element 2, in this case the excavator boom, a work equipment, for example an excavator shovel, usually is arranged. When lowering the movable element 2, the potential energy of the movable element and of the work equipment should now be recovered and stored, in order to at least partly compensate the static forces, which otherwise would rest on the working hydraulic cylinders due to the weight of the movable element and the work equipment, during the upward movement of the movable element and to thus have to supply less energy by means of the working hydraulic cylinders 1. For this purpose, the hydraulic cylinder according to the invention advantageously includes a chamber filled with gas. On lowering the movable element, the gas in the gas-filled chamber of the energy recovery cylinder is compressed, whereas it expands on lifting the movable element and thereby supports the working hydraulic cylinders 1. For this purpose, the energy recovery cylinder according to the invention advantageously is filled with gas on its bottom side and furthermore advantageously includes a hollow piston rod open towards the bottom side.

Figure 2B:
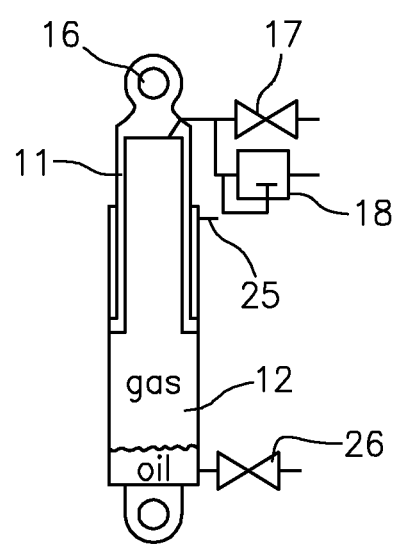
FIG. 2b shows a schematic diagram of a second variant of the energy recovery cylinder according to the invention.

FIGS. 2a and 2b now show schematic drawings of two variants of an energy recovery cylinder 3. Both exemplary embodiments include a cylinder 10 in which a piston rod 11 is axially movably mounted. The piston rod 11 has the shape of a hollow cylinder, so that in the interior of the piston rod 11 a cavity 13 is obtained, which is open towards the bottom side 12 of the cylinder. The bottom side 12 of the energy recovery cylinder 3 and the cavity 13 in the interior of the piston rod 11 form a coherent chamber which is filled with pressurized gas. During a movement of the piston rod 11 in the cylinder 10 the size of the bottom side 12 is varied, so that with fully retracted piston rod 11 the volume filled with gas substantially corresponds to the cavity 13 in the interior of the hollow piston rod, whereas with fully extended piston rod it corresponds to the volume of this cavity 13 plus the volume of the cylinder 10.

The energy recovery cylinder includes a bottom-side bearing eye 15 and a piston-rodside bearing eye 16, with which it is articulated to the implement and the movable element. The energy recovery cylinder is articulated between movable element and implement such that the piston rod 11 is moved downwards against the bottom of the energy recovery cylinder by the weight of the movable element and the work equipment, so that the gas volume is compressed. Due to the design of the energy recovery cylinder according to the invention with a hollow piston rod 11, sufficient gas volume also is present with retracted cylinder, in order to provide for a flat increase in pressure on lowering the work equipment. On the other hand, during an upward movement of the movable element, part of the weight rests on the gas volume in the energy recovery cylinder, so that the working hydraulic cylinders no longer must apply the complete static load.

The energy recovery cylinder includes a filling valve 17 for filling the chamber with gas and a pressure limiting valve 18 for limiting the gas pressure. In the first exemplary embodiment in FIG. 2a, the filling valve 17 and the pressure limiting valve 18 are arranged on the bottom side. In the second exemplary embodiment shown in FIG. 2b, however, the filling valve 17 and the pressure limiting valve 18 are arranged on the side of the piston rod.

The energy recovery cylinders shown in FIGS. 2a and 2b are two-sided hydraulic cylinders, so that an annular space 14 is provided, which is connectable to a hydraulic system of the implement via a port 12. The bottom side also can include a port via which it is connectable to a hydraulic system of the implement.

As shown in FIG. 2b, the gas volume in the energy recovery cylinder can be varied by supplying or discharging oil to or from the energy recovery cylinder. In the second exemplary embodiment in FIG. 2b, a port 20 for supplying oil therefore is provided, by which the bottom space of the energy recovery cylinder is connectable to a hydraulic system of the implement.

The inventors of the present invention have found that the temperature of the gas in the energy recovery cylinder has a considerable influence on its operation. In accordance with the invention it therefore is provided to actuate the working drive and in particular the working hydraulics in dependence on this temperature, so as to keep the influence of the gas temperature on the operation of the implement as low as possible.

In particular, a temperature sensor is provided, which directly or indirectly measures the temperature of the gas in the chamber filled with gas. Advantageously, a control signal is provided for actuating the working drive in dependence on the temperature signal of the temperature sensor. Advantageously, the temperature signal is averaged over a certain time period and used as input variable of the controller.

FIG. 3 now shows a first exemplary embodiment of such a control system. The working drive is formed by two working cylinders 1, as they have already been described above. The same each have pressure chambers 35 and 36, which are connected with a pressure supply via a control valve 32. The pressure supply is provided by a hydraulic pump 30. The primary pressure provided by the pump 30 is limited by a primary pressure limiting valve 31. Advantageously, the primary pressure limiting valve 31 is arranged between the pump 30 and the control valve 32.

In accordance with the invention, a temperature sensor 40 now is arranged on the energy recovery cylinder 3, which measures the temperature of the gas of the energy recovery cylinder. For example, the temperature sensor directly measures the gas temperature, so that it is possible to relatively quickly react to temperature fluctuations. An indirect measurement of the temperature may be advantageous, however, since the gas temperature fluctuates very much depending on the state of movement. The temperature signal of the temperature sensor 40 is provided to a controller 41 as input variable, in which controller the signal will be processed. The controller 41 actuates an adjusting unit 42 for adjusting the pressure limiting valve 31. In this way, the primary pressure of the working hydraulics can be adjusted in dependence on the temperature signal.

By this adjustment of the primary pressure two problems can be solved: When the temperature in the energy recovery cylinder 3 falls below a certain setpoint $T_{set}$ (for example at the start of work in winter), the energy recovery cylinder 3 does not provide the setpoint pressure or the desired setpoint cylinder force, in order to achieve the lifting capacities achievable at setpoint gas temperature. To achieve the lifting capacities despite a lower gas temperature, the primary pressure limitation of the boom cylinders is temporarily increased in accordance with the invention in the required and admissible range in dependence on the gas temperature. In particular, the pressure limitation can be increased above the usual setpoint of for example 350 bar, so as to keep the total lifting capacity at a desired setpoint even at low temperatures.

If the gas temperature rises as a result of the work activity or as a result of a supply of external heat, the primary pressure limitation of the boom cylinders can be reduced again, for example to the setpoint of e.g. 350 bar.

However, if the gas temperature in the energy recovery cylinder rises above a certain setpoint, the achievable lifting capacities will increase, whereby the load of the equipment is increased and the useful life is reduced. To counteract such higher load of the equipment, the primary pressure limitation of the boom cylinders is reduced temporarily in accordance with the invention in dependence on the gas temperature, when the same rises above a certain setpoint.

By this adaptation of the primary pressure limitation of the boom cylinders in dependence on the gas temperature in the energy recovery cylinder, the desired lifting capacities can be secured and the load of the equipment can be limited.

For realizing the actuation, a plurality of different possibilities are available. In particular, the primary pressure in dependence on the temperature of the gas in the energy recovery cylinder can be stored in the controller, for example in the form of a map. Advantageously, the actuation is effected with reference to an averaged gas temperature. Within a certain time interval, the mean gas temperature each can be determined and be used as control variable for the primary pressure limitation of the boom cylinders.

Figure 4A:
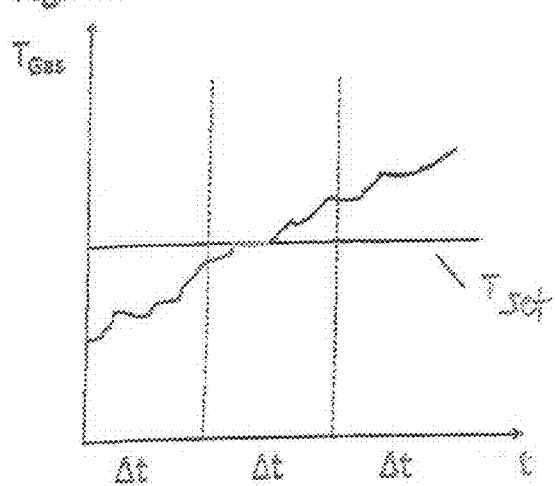
FIG. 4a shows a diagram which by way of example represents a temperature profile of the temperature of the gas in the energy recovery cylinder.
Figure 4B:
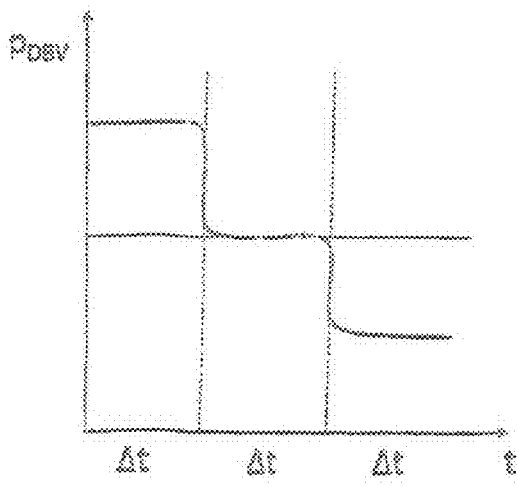
FIG. 4b shows a diagram which represents the primary pressure of a working hydraulic in dependence on the temperature profile shown in FIG. 4a, FIG. 5 shows a second exemplary embodiment of a controller for a working drive according to the invention, wherein the work dynamics is adjusted in dependence on the temperature of the gas in the energy recovery cylinder, in particular the maximum speed of movement.

FIG. 4a shows an exemplary temperature development of the temperature $T_{gas}$ in the energy recovery cylinder over time, wherein the same first lies below the setpoint temperature $T_{set}$ and subsequently rises above the same. In the exemplary embodiment, averaging each is effected over time periods $\Delta t$. In the first time period $\Delta t$, the averaged temperature lies below the setpoint temperature $T_{set}$, so that an increased primary pressure P is employed. In the next period $\Delta t$, the averaged temperature substantially lies within the range of the setpoint temperature, so that the usual primary pressure P is employed. In the subsequent time period $\Delta t$, however, the temperature lies above the setpoint temperature $T_{set}$, so that a correspondingly lower primary pressure P is employed. In accordance with the invention, the mean gas temperature hence each is determined for each time interval, and for this temperature the corresponding primary pressure is adjusted.

The primary pressure to be adjusted advantageously is determined in dependence on the cylinder force of the energy recovery cylinder at the respective temperature and the maximum admissible primary pressure, such that the fluctuations of the total lifting capacity of the implement and the fluctuations of the load of the equipment due to the temperature in the energy recovery cylinder are kept as small as possible.

Figure 5:
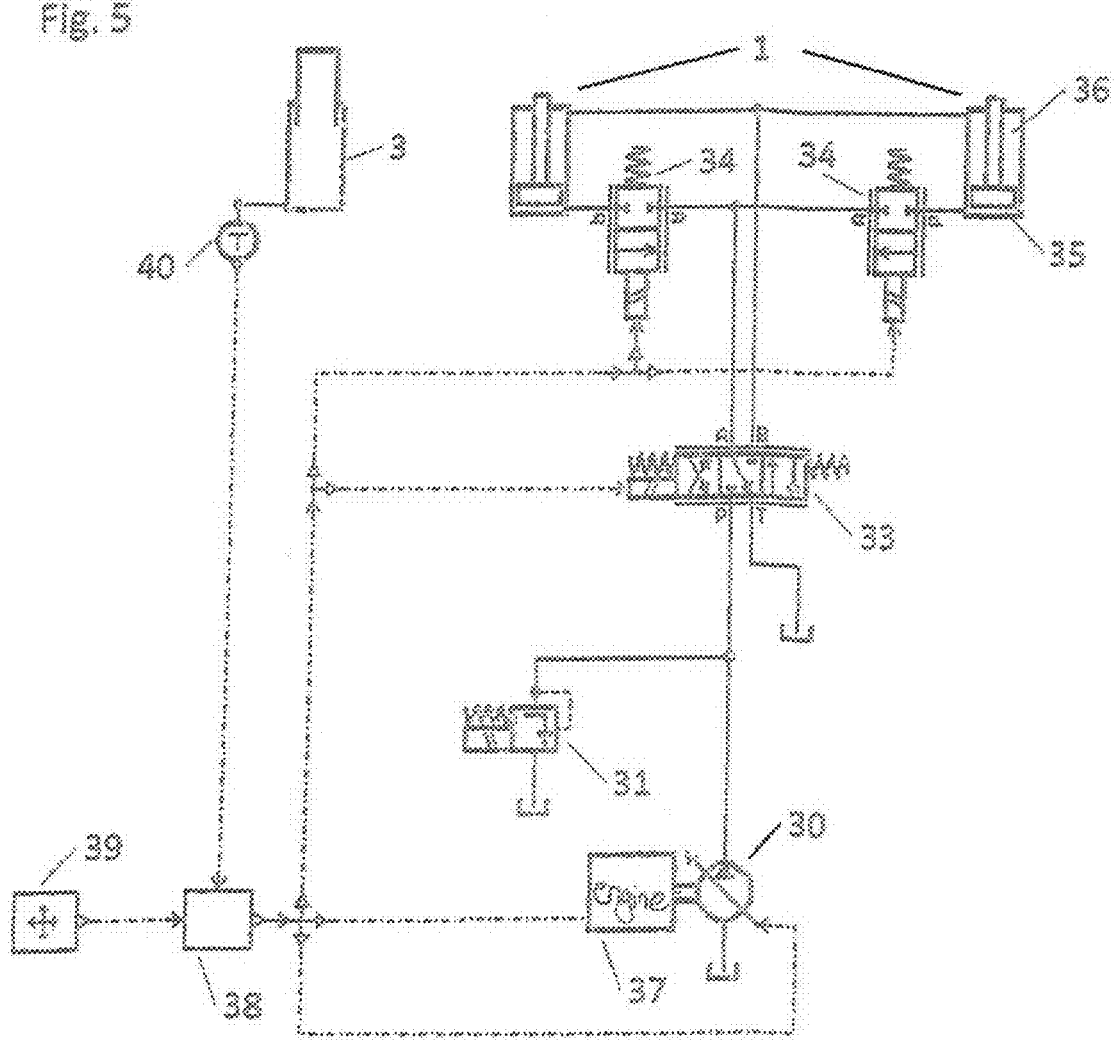

FIG. 5 now shows a second exemplary embodiment of the present invention, by means of which the influence of the gas temperature on the work dynamics of the implement is kept as small as possible.

The working cylinders 1 in turn include pressure chambers 35 and 36, by whose pressurization with hydraulic fluid the working cylinders 1 can be moved. There is provided a pump 30 which supplies the pressure chambers 35 and 36 with high pressure via a control valve 33. This pump is a variable displacement pump which is actuated via a controller 38. The pump 30 is driven via an internal combustion engine 37 which likewise is actuated by the controller 38. The valve 33 serves for actuating the direction and speed of movement of the hydraulic cylinders 1 at least on lifting. The valve 33 likewise is actuated by the controller 38. Furthermore a tank is provided, into which hydraulic fluid can flow off. For adjusting the lowering speed, valves 34 are provided, via which the speed with which hydraulic fluid can flow off from the bottom chambers 35 to the tank and hence the lowering speed can be adjusted. These valves also are actuated via the controller 38.

There is provided a control element 39, via which an operator can enter input commands for moving the element to be moved, in particular the boom. These input commands are processed in the control unit 39 and used for actuating the valves, the pump 30 and the engine 37.

In accordance with the invention, a sensor 40 now is provided for determining the temperature of the gas in the energy recovery cylinder 3, where the measurement signals of the temperature sensor 40 are provided to the controller 38. The actuation of the movement function of the working cylinder is adapted to the characteristic of the energy recovery cylinder changed by the gas temperature such that the effects of the changing gas temperature on the total characteristic of the implement are at least partly compensated. In particular, in dependence on the currently mean gas temperature the actuation of the boom lifting and lowering function is adapted such that the maximum lowering or hoisting speed of the boom can always be kept the same.

On lowering, the pilot pressure or the electric pilot signals of the respective valves, in particular the valves 34 (pipe-rupture valves) is increased or reduced selectively in dependence on the gas temperature, in order to adapt the maximum valve opening cross-section and hence keep the maximum lowering speed approximately constant.

On lifting, the pilot pressure or the electric pilot signals of the respective valves, in particular of the control block 33, is increased or reduced selectively in dependence on the gas temperature, in order to adapt the valve opening cross-section and hence keep the maximum hoisting speed approximately constant. In addition, the pivoting angle of the hydraulic pump 30 and the speed of the internal combustion engine 37 can be adapted selectively.

By adapting the pilot pressures or the electric pilot signals in dependence on the gas temperature in the energy storage cylinder, both the work dynamics of the machine and the component load can be kept constant. The energy storage cylinder can act as an autarkical system, since the temperature-dependent adaptation of the work dynamics is effected by a modification of the existing hydraulic system and/or its actuation.

Advantageously, the gas temperature is averaged and used as actuation variable. In particular, the mean gas temperature each is determined within a certain time interval and used as control variable.

Figure 6A:
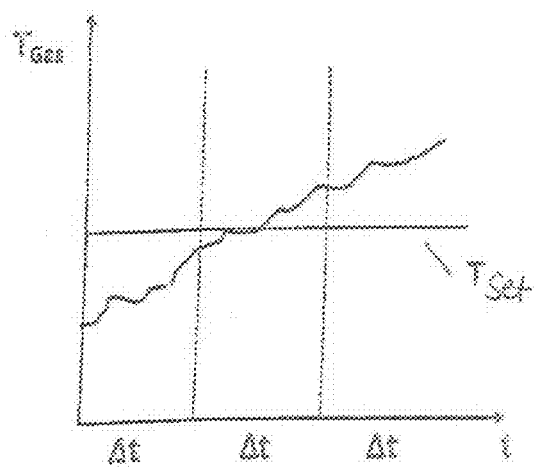
FIG. 6a shows a diagram which represents a temperature profile of the gas in the energy recovery cylinder.
Figure 6B:
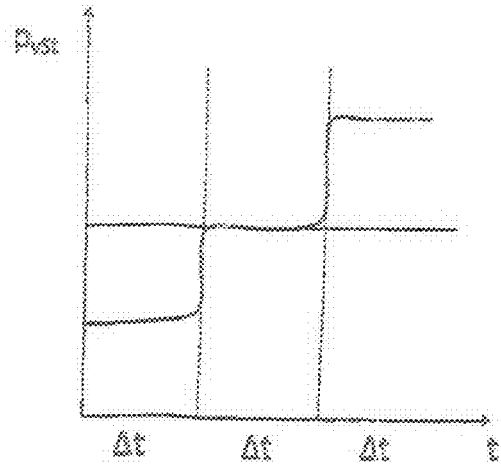

FIG. 6a shows a diagram of an exemplary temperature profile of the temperature $T_{gas}$ of the gas in the energy storage cylinder. Like in FIG. 4a, the temperature in a first time period $\Delta t$ lies below the setpoint temperature $T_{set}$, in a middle time period $\Delta t$ substantially within the range of the setpoint temperature, and in a third time period $\Delta t$ above the setpoint temperature. Correspondingly, the pilot pressure shown in FIG. 6b is varied for the pipe-rupture valves 34, by which the lowering speed is adjusted. Since the working drive (boom cylinder) and the gas cylinder are coupled via the excavator boom, the work dynamics of the work equipment results from the cooperation of the gas cylinder and the working drive.

At a temperature lower than the setpoint temperature, a lower pilot pressure therefore is chosen in the first time period $\Delta t$, in order to compensate the lower counterforce of the energy recovery cylinder by a correspondingly lower pilot pressure and hence smaller maximum valve opening cross-section, in order to keep the maximum lowering speed constant. In the middle time period $\Delta t$, however, a normal pilot pressure is chosen, since the temperature substantially corresponds to the setpoint temperature. In the third time period $\Delta t$, the pilot pressure is increased and hence the maximum valve opening cross-section is increased, so as to achieve a constant lowering speed of the work equipment, in order to compensate the higher counterforce of the gas cylinder as a result of the higher temperature.

On lifting, the actuation of the pilot pressure of the control valve 33 is effected exactly the other way round, in order to compensate the correspondingly lower hoisting speed at low temperatures or higher hoisting speed at high temperatures.

In summary, it can thus be noted that on lifting and lowering the movable element, the work dynamics of the implement according to the invention is changed due to the force-path characteristic curve of the energy recovery cylinder dependent on the gas temperature, when the actuation of the working drive is adjusted to the setpoint characteristic of the energy recovery cylinder at a setpoint temperature.

At a gas temperature lower than the setpoint temperature, a greater lowering speed and a smaller hoisting speed would result, whereas at a gas temperature greater than the setpoint temperature a lower lowering speed and a greater hoisting speed would result. On the one hand, the component loads increase at too great hoisting and lowering speeds, but on the other hand the operator is stressed more with changing work dynamics, and in part activities such as throwing off scrap no longer are possible when sufficient speeds no longer are available.

In accordance with the invention, the maximum pilot pressures or electric pilot signals and hence the maximum valve opening cross-sections therefore are adapted correspondingly, in order to compensate the change in the characteristic of the energy recovery cylinder and hence keep the working speed of the work equipment constant. On lowering, the maximum valve opening cross-section therefore is increased at a low gas temperature. On lifting, on the other hand, the maximum valve opening cross-section is increased at a lower gas temperature, whereas the maximum valve opening cross-section is reduced at a higher gas temperature. Advantageously, the actuation of the boom lifting and lowering function is adapted such that the maximum lowering or hoisting speed of the boom can always be kept the same.

The two exemplary embodiments of the present invention, which in the first exemplary embodiment at least partly compensate the influence of the gas temperature on the maximum lifting capacity, and in the second exemplary embodiment the influence of the gas temperature on the work dynamics, can of course also be combined.

The invention claimed is:

1. An implement, comprising:
a movable element connected to a base structure;
at least one working drive for moving the movable element, the working drive connected to the base structure and the movable element;
at least one energy recovery cylinder for energy recovery from the movement of the movable element, the energy recovery cylinder including a piston and a chamber filled with gas, and connected to the base structure and the movable element;
a temperature sensor arranged on the energy recovery cylinder for measuring the gas temperature in the energy recovery cylinder chamber and generating a temperature signal; and
a controller programmed to adjust the actuation of the working drive based on the temperature signal received from the temperature sensor.

2. The implement according to claim 1, wherein the temperature signal is averaged over a certain time period and used as input variable of the controller.

3. The implement according to claim 2, wherein the maximum force of the working drive is adjusted in dependence on the temperature signal.

4. The implement according to claim 2, wherein the work dynamics of the working drive is adjusted in dependence on the temperature signal.

5. The implement according to claim 2, wherein the working drive comprises at least one working hydraulic cylinder, and the actuation of the hydraulics of the working hydraulic cylinder is effected in dependence on the temperature signal.

6. The implement according to claim 5, wherein the primary pressure of the hydraulics of the working drive is adjusted in dependence on the temperature signal by actuating a primary pressure limiting valve wherein the primary pressure is increased if the temperature of the energy recovery cylinder is below a predetermined set point temperature $T_{set}$ and decreased if the temperature of the energy recovery cylinder is above the predetermined setpoint temperature $T_{set}$.

7. The implement according to claim 5, including pipe-rupture valves, wherein a pilot pressure for the pipe-rupture valves is reduced if the temperature of the energy recovery cylinder is below a predetermined set point temperature $T_{set}$ and increased if the temperature of the energy recovery cylinder is above the predetermined setpoint temperature $T_{set}$ such that the work dynamics of the hydraulics of the working hydraulic cylinder is adjusted in dependence on the temperature signal by adjusting the pilot pressure and/or actuation of the valves for lifting and/or lowering the movable element and/or by actuating a working pump and/or a drive motor.

8. The implement according to claim 1, wherein the temperature signal is averaged over a certain time period and used as input variable of the controller.

9. The implement according to claim 8, wherein the maximum force of the working drive is adjusted in dependence on the temperature signal.

10. The implement according to claim 2, wherein the maximum force of the working drive is adjusted in dependence on the temperature signal.

11. The implement according to claim 1, wherein the maximum force of the working drive is adjusted in dependence on the temperature signal.

12. The implement according to claim 11, wherein the work dynamics of the working drive is adjusted in dependence on the temperature signal.

13. The implement according to claim 10, wherein the work dynamics of the working drive is adjusted in dependence on the temperature signal.

14. The implement according to claim 9, wherein the work dynamics of the working drive is adjusted in dependence on the temperature signal.

15. The implement according to claim 8, wherein the work dynamics of the working drive is adjusted in dependence on the temperature signal.

16. The implement according to claim 3, wherein the work dynamics of the working drive is adjusted in dependence on the temperature signal.

17. The implement according to claim 2, wherein the work dynamics of the working drive is adjusted in dependence on the temperature signal.

* * * * *